United States Patent [19]

Bojarczuk et al.

[11] Patent Number: 6,092,811
[45] Date of Patent: Jul. 25, 2000

[54] HYBRID GASKET

[75] Inventors: Raphael M. Bojarczuk, Houston; Roger Dean Paulson, Navasota, both of Tex.

[73] Assignees: Jamco Products, LLC; Exxon Research and Engineering Co.; a part interest

[21] Appl. No.: 08/935,687

[22] Filed: Sep. 23, 1997

Related U.S. Application Data

[63] Continuation of application No. 08/647,435, Apr. 30, 1996, abandoned.

[51] Int. Cl.[7] ........................................ F16J 15/12
[52] U.S. Cl. ..................... 277/627; 277/652; 277/938; 277/946
[58] Field of Search ........................ 277/592, 600, 277/601, 627, 650, 651, 652, 654, 938, 944, 945, 946

[56] References Cited

U.S. PATENT DOCUMENTS

| | | |
|---|---|---|
| 222,388 | 12/1879 | Doty . |
| 854,135 | 5/1907 | Whittemore . |
| 922,130 | 5/1909 | Goetze . |
| 1,030,055 | 6/1912 | Darlington . |
| 2,580,546 | 1/1952 | Hobson, Jr. ........................ 277/204 |
| 3,404,061 | 10/1968 | Shane et al. . |
| 3,841,289 | 10/1974 | Meyers . |
| 3,903,959 | 9/1975 | Fushimi et al. . |
| 3,926,539 | 12/1975 | Lamm . |
| 4,083,570 | 4/1978 | Sugawara . |
| 4,116,451 | 9/1978 | Nixon et al. . |
| 4,118,850 | 10/1978 | Owen et al. . |
| 4,121,858 | 10/1978 | Schulz . |
| 4,160,551 | 7/1979 | Nixon et al. . |
| 4,190,257 | 2/1980 | Schnitzler . |
| 4,234,638 | 11/1980 | Yamazoe et al. . |
| 4,299,332 | 11/1981 | Pechacek . |

(List continued on next page.)

FOREIGN PATENT DOCUMENTS

| | | | |
|---|---|---|---|
| 700414 | 12/1964 | Canada ................................ | 285/363 |
| 268 134 | 5/1988 | European Pat. Off. . | |
| 1 118 630 | 6/1956 | France . | |
| 2016305 | 7/1994 | Russian Federation ........... | 277/207 A |
| 2066383 | 7/1981 | United Kingdom ................. | 277/204 |
| 2 229 047 | 9/1990 | United Kingdom . | |
| 2278893 | 12/1994 | United Kingdom ............... | 277/207 A |
| 94/02771 | 2/1994 | WIPO ................................. | 277/207 A |

OTHER PUBLICATIONS

Durabla Manufacturing Company, *Durabla Gasket Material Brochure*, Ontario, Canada (No date available).
Durabla Manufacturing Company, *Durabla Gasket Materials Brochure*, Ontario, Canada (No date available).

(List continued on next page.)

*Primary Examiner*—Anthony Knight
*Assistant Examiner*—John L. Beres
*Attorney, Agent, or Firm*—Cummings & Lockwood

[57] ABSTRACT

A hybrid gasket includes a core defining an aperture therein, the core having an outer edge portion and an inner edge portion immediately surrounding the aperture. The gasket further includes a chemically resistant material encapsulating the inner edge portion, and an expanded graphite material encapsulating the outer edge portion. A method of sealing two substantially parallel surfaces includes the steps of interposing between the surfaces a gasket, and securing the surfaces to one another. The gasket including a core defining an aperture therein, the core having an outer edge portion and an inner edge portion immediately surrounding the aperture. The gasket further including a chemically resistant material encapsulating the inner edge portion and an expanded graphite material encapsulating the outer edge portion. A method of forming a gasket includes the steps of providing a core defining an aperture therein, the core having an outer edge portion and an inner edge portion immediately surrounding the aperture, encapsulating the outer edge portion with an expanded graphite material, and encapsulating the inner edge portion with a chemically resistant material.

12 Claims, 8 Drawing Sheets

U.S. PATENT DOCUMENTS

| | | |
|---|---|---|
| 4,318,548 | 3/1982 | Oberle et al. ............... 277/207 A |
| 4,333,975 | 6/1982 | Booth . |
| 4,350,346 | 9/1982 | Fowler . |
| 4,394,023 | 7/1983 | Hinojosa . |
| 4,422,894 | 12/1983 | Atkinson et al. . |
| 4,423,544 | 1/1984 | Kashmerick . |
| 4,455,334 | 6/1984 | Ogino et al. . |
| 4,465,287 | 8/1984 | Bindel et al. . |
| 4,471,968 | 9/1984 | Schlaupitz et al. . |
| 4,485,138 | 11/1984 | Yamamoto et al. . |
| 4,559,248 | 12/1985 | Sumiyoshi et al. . |
| 4,591,170 | 5/1986 | Nakamura et al. . |
| 4,665,978 | 5/1987 | Luke . |
| 4,676,515 | 6/1987 | Cobb . |
| 4,705,278 | 11/1987 | Locacius et al. . |
| 4,709,758 | 12/1987 | Preston, Jr. . |
| 4,723,783 | 2/1988 | Belter et al. . |
| 4,743,421 | 5/1988 | McDowell et al. . |
| 4,744,572 | 5/1988 | Sahba et al. . |
| 4,753,443 | 6/1988 | Nicholson . |
| 4,776,602 | 10/1988 | Gallo . |
| 4,795,174 | 1/1989 | Whitlow . |
| 4,796,351 | 1/1989 | Gee . |
| 4,799,956 | 1/1989 | Vogel . |
| 4,810,454 | 3/1989 | Belter . |
| 4,822,062 | 4/1989 | Gallo et al. . |
| 4,872,506 | 10/1989 | Nilsson et al. . |
| 4,892,320 | 1/1990 | Tuckmantel . |
| 4,911,972 | 3/1990 | Mercuri . |
| 5,421,594 | 6/1995 | Becerra . |
| 5,494,301 | 2/1996 | Hamilton et al. ............... 277/229 |
| 5,511,797 | 4/1996 | Nikirk et al. ............... 277/207 A |
| 5,518,257 | 5/1996 | Breaker ............... 277/207 A |
| 5,527,047 | 6/1996 | Waterland, III ............... 277/204 |
| 5,556,113 | 9/1996 | Amorese et al. ............... 277/233 |
| 5,558,347 | 9/1996 | Nicholson ............... 277/213 |

OTHER PUBLICATIONS

Marine & Petroleum Mfg., Inc., *Teflon\* Envelope Gaskets Brochure*, Houston, Texas (No date available).

Marine & Petroleum Mfg., Inc., *Heat Exchanger Gaskets Brochure*, Houston, Texas (No date available).

Marine & Petroleum Mfg., Inc., *Sealing and Protection Products Brochure*, Houston, Texas (No date available).

Marine & Petroleum Mfg., Inc., *Sealing and Protection Products Brochure*, Houston, Texas (No date available).

Lamons, *Lamons 360GTH Dimensional Information*, (No date available).

Marine & Petroleum Mfg., Inc. *Heat Exchanger One–Stop Source for Gaskets*, Houston, Texas (No date available).

Marine & Petroleum Mfg., Inc., *Graphonic Material Data Sheet*, Freeport, Texas (No date available).

Marine & Petroleum Mfg., Inc., *M&P Graphonic® Gaskets Save You Money Brochure*, Freeport, Texas (No date available).

Paul A. Mattingly, Jr., *M&P Sealing and Protection Products—Bringing Gasket Selection Into Focus*, Orange, Texas (No date available).

M&P Times, *M&P Cited for Sealing Innovation*, Houston, Texas (Spring, 1993).

Marine & Petroleum Mfg., Inc., *Tighten Up with M&P Graphonic™ Brochure*, Houston, Texas (No date available).

Marine & Petroleum Mfg., Inc., *M & P Fire Integrity Certification of GRAPHONIC™ Gaskets, Information Sheet No. 101*, Houston, Texas (No date available).

Marine & Petroleum Mfg., Inc., *M&P Crush Test*, (No date available).

Marine & Petroleum Mfg., Inc., *Gaskets Retain Integrity During Fire Exposure Tests*, Orange, Texas (Nov. 1992).

Slade, *Put a Little Life in Your Flange . . . With Slade Liveload™ Gaskets*, Mooresville, N.C. (No date available).

Sigri GmbH, *Sigraflex Products Manufactured From Flexible Graphite Foil Brochure*, Federal Republic of Germany (Jul. 1990).

Union Carbide Corporation, *Gasket Specification*, Cleveland, Ohio (Dec. 1, 1988).

Union Carbide Corporation, *Grafoil® Flexible All–Graphite Universal Gasket Tape*, Cleveland, Ohio (Oct. 1985).

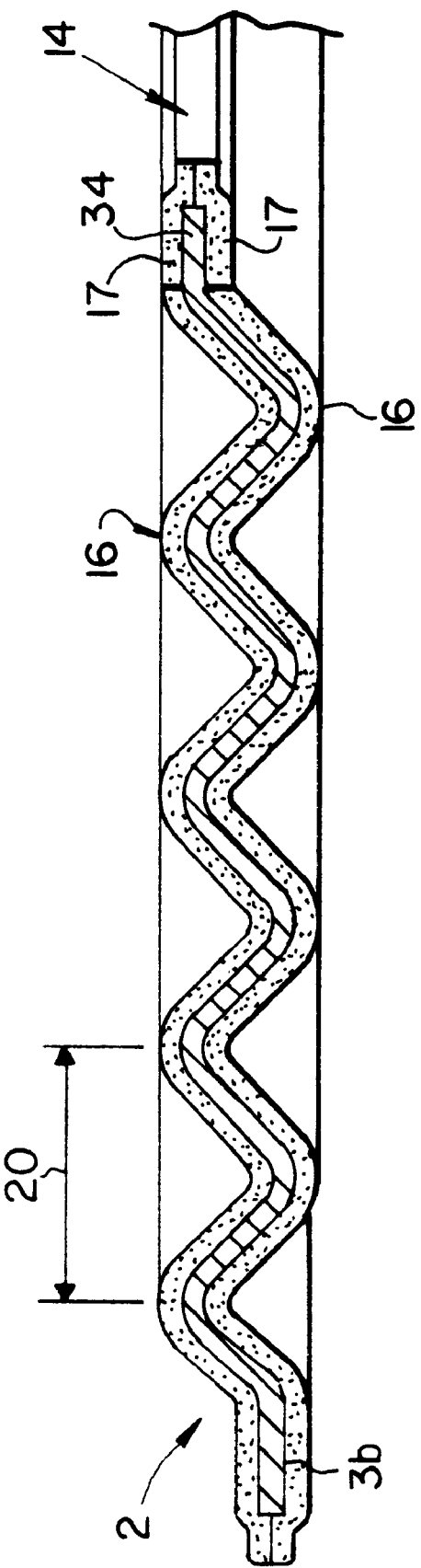

HYBRID GASKET

This is a continuation of application Ser. No. 08/647,435, filed Apr. 30, 1996, now abandoned.

FIELD OF THE INVENTION

This invention relates generally to gaskets for sealing parallel opposing surfaces.

BACKGROUND OF THE INVENTION

In the petrochemical industry there has existed a need for a versatile flange gasket and heat exchanger gasket made of a non-asbestos material. Generally, the characteristics desired of a gasket for industrial applications include: continuous, fail-safe operation thereby avoiding potential damage to human health, plant equipment and the surrounding environment; fire resistance; resistance to temperature differentials across the diameter of the gasket; chemical resistance; field ruggedness; positive sealing even when the gasket is misaligned; positive sealing when the gasket material differs in thermal expansivity with respect to the surface to be sealed; environmentally safe, non-asbestos construction; operability at high pressures and temperatures; resiliency, springiness, memory, and structural integrity particularly during thermal cycling from high temperatures to low temperatures and vice versa, thermal shock, or other thermal excursions; low torque requirements for maintaining a positive seal at all operational or accidental temperatures and pressures to avoid subjecting the flanges (or other surface) and flange bolts to warpage and/or other damage; inhibited gasket creep or cold flow; crush resistance to enhance the potential for gasket reusability; minimized extrusion of the gasket coating; and reduced installation and maintenance time. A gasket designed with these characteristics in mind is described in U.S. Pat. No. 5,421,594 and includes a corrugated metal core member encapsulated with an expanded graphite.

Although expanded graphite encapsulated gaskets provide a wide variety of desirable characteristics, they are incompatible with certain applications in which graphite degradation results from a particular combination of chemicals, temperatures, pressures, and other operational conditions. For example, these gaskets cannot be used in the presence of strong oxidizing compounds (e.g., concentrated nitric acids, highly concentrated sulfuric acid, chromium (VI) and permanganate solutions, chloric acid, and molten alkaline and alkaline earth metals) to which graphite is not resistant.

SUMMARY OF THE INVENTION

In one aspect, the invention relates to a gasket having a core defining an aperture therein, the core having an outer edge portion and an inner edge portion immediately surrounding the aperture. The gasket further includes a chemically resistant material encapsulating the inner edge portion, and an expanded graphite material encapsulating the outer edge portion.

In another aspect, the invention relates to a gasket having a core defining an aperture therein, the core having an outer edge portion and an inner edge portion immediately surrounding the aperture. The gasket further includes a first and a second layer of expanded fluorocarbon polymer coupled to opposite sides of the core, the fluorocarbon polymer layers extending beyond and encapsulating the inner edge portion. The gasket further includes a first and a second layer of expanded graphite material coupled to opposite sides of the core, the graphite material layers extending beyond and encapsulating the outer edge portion.

In another aspect, the invention relates to a method of sealing two substantially parallel surfaces including the steps of interposing between the surfaces a gasket, and securing the surfaces to one another. The gasket includes a core defining an aperture therein, the core having an outer edge portion and an inner edge portion immediately surrounding the aperture. The gasket further includes a chemically resistant material encapsulating the inner edge portion and an expanded graphite material encapsulating the outer edge portion.

In another aspect, the invention relates to a method of forming a gasket including the steps of providing a core defining an aperture therein, the core having an outer edge portion and an inner edge portion immediately surrounding the aperture, encapsulating the outer edge portion with an expanded graphite material, and encapsulating the inner edge portion with a chemically resistant material.

BRIEF DESCRIPTION OF THE DRAWINGS

FIG. 4 is a partial cross-sectional view of a corrugated gasket after encapsulation of the inner border with a graphite material and encapsulation of the outer border with a fluorocarbon polymer.

DETAILED DESCRIPTION

This invention provides an especially effective fail-safe gasket system useful in a broad range of operational conditions. The gasket includes a core which is partially encapsulated in a graphite material and encapsulated about its inner diameter with a chemically resistant material. The core is typically constructed of a corrugated metal material, preferably stainless steel. The graphite material is typically an expanded graphite, preferably a nuclear grade, at least about 95% pure graphite (carbon), having no binders or resins, and having less than 50 parts per million leachable chloride and/or fluoride content. The chemically resistant material is typically a fluorocarbon polymer, preferably polytetrafluoroethylene (PTFE). The graphite and chemically resistant materials are typically applied as a sheath having a thickness sufficient to coat the corrugations of the core, while maintaining the gasket's corrugated contour.

Figure 1:
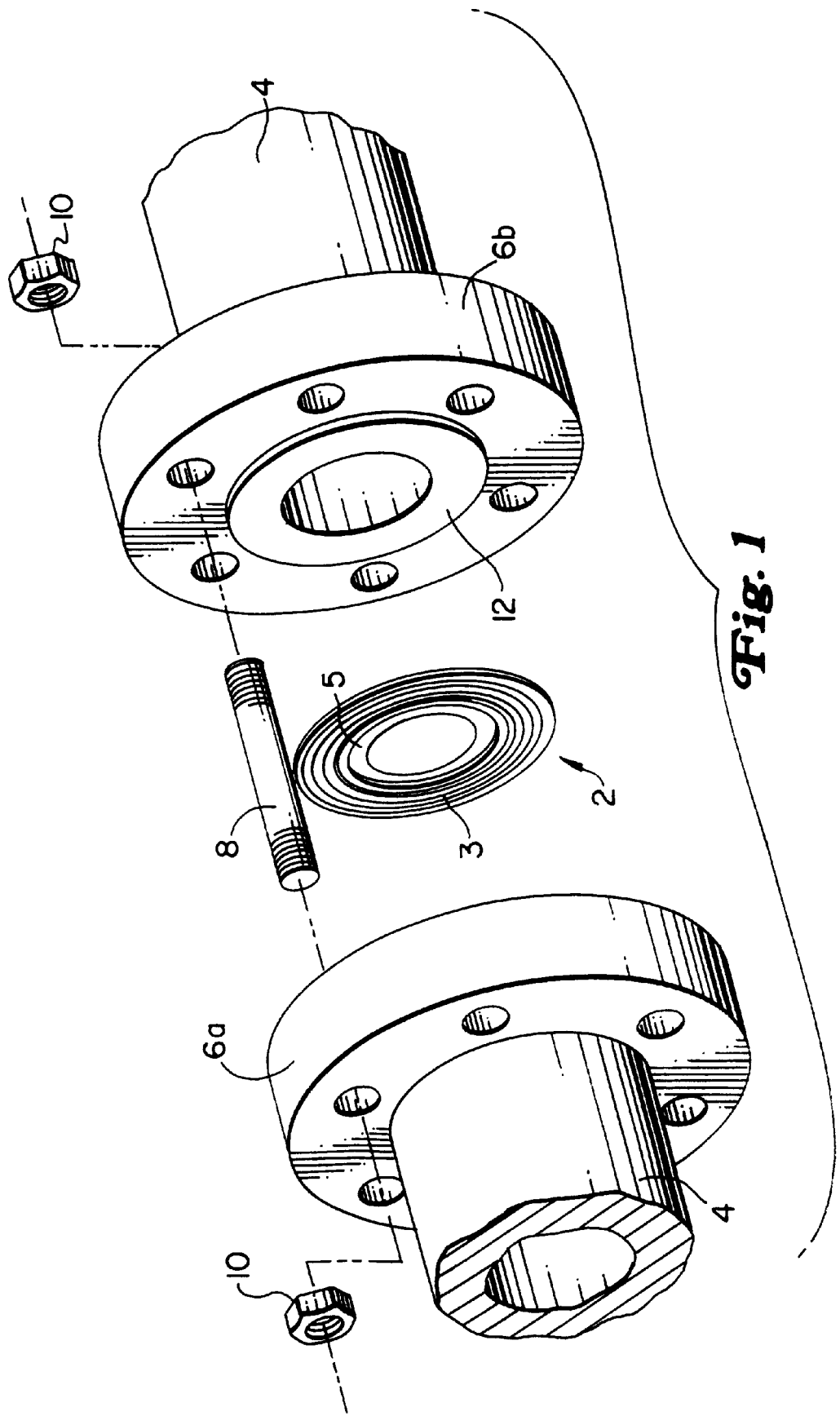
FIG. 1 is an exploded view of a corrugated, graphite and fluorocarbon polymer encapsulated gasket in accordance with one embodiment of the invention employed between two flange surfaces.

Referring to FIG. 1, there is shown an exploded view of a pipeline connection employing an expanded graphite 3 and fluorocarbon polymer 5 encapsulated ring gasket 2 according to one embodiment of the invention. This gasket 2 can be employed in a pipeline 4 between two flanges 6a and 6b which are secured together using standard techniques, such as with threaded shafts or bolts 8 and nuts 10 to create a fail-safe, multi-sealed connection in a pipeline used in, for example, the petrochemical industry. As illustrated here, the flange surfaces can be in a raised configuration 12; a recessed or confined joint configuration (not shown); a flat configuration (not shown); or any other flange connection employed in the industry. Furthermore, the raised flange surface 12 (or other flange sealing surface) may be of a smooth, polished finish; a rough, RMS finish; or have scratches, pitting, and other wear as may result from prior use.

The graphite and fluorocarbon polymer encapsulated gaskets of the invention may be used in a wide variety of operational settings in which gaskets encapsulated with either expanded graphite alone or expanded fluorocarbon polymer alone would be unsuitable. More specifically, there are numerous applications (e.g., lube oil services, hydrofluoric acid services, oxygen services, potable water services, and cryogenic services) in which although graphite is the preferred gasket encapsulation material (e.g., because of its fire resistance and sealing capabilities), it creates product and instrument contamination problems (i.e., because of degradation of the graphite layer). Although gaskets encapsulated completely with chemically resistant materials, such as expanded fluorocarbon polymers, eliminate graphite contamination problems, their expense and lack of fire resistance limit their usefulness. In contrast, hybrid gaskets encapsulated with graphite and a chemically resistant material combine the advantages of both to create a nearly universal gasket compatible with services requiring fire resistance, low torque sealing, and product purity, over a wide temperature range (e.g., approximately −268° C. to 316° C.). For example, the visually observable contamination of lube oil flowing through pipelines having their flanges sealed with traditional graphite gaskets can be eliminated by providing a graphite gasket having its inner diameter encapsulated with Teflon™ (i.e., an expanded fluorocarbon polymer resistant to degradation in this environment).

Figure 2:
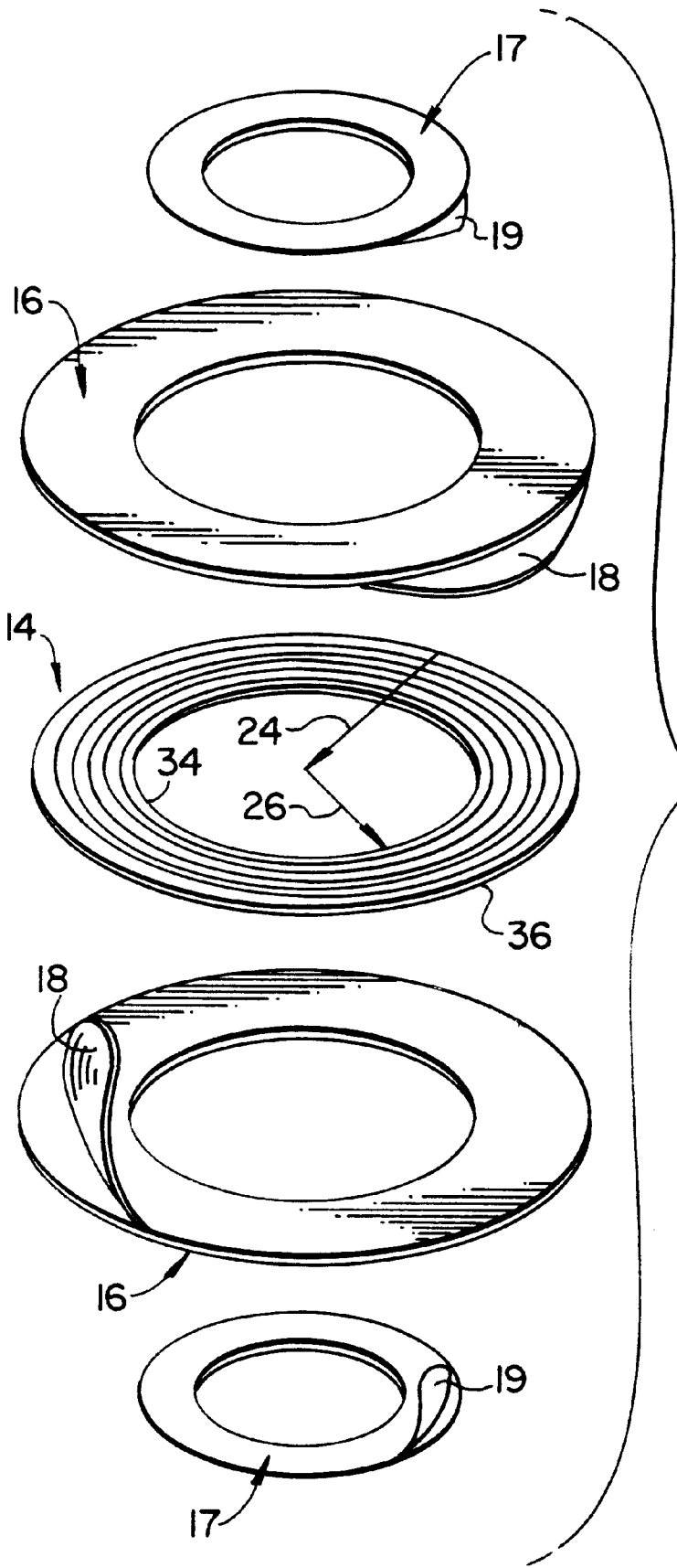
FIG. 2 is an exploded view of a corrugated gasket prior to encapsulation with a graphite material according to one embodiment of the invention.

FIG. 2 shows an exploded view of a corrugated gasket core 14 prior to encapsulation of the outer border 36 with a graphite material 16, such as an expanded graphite with adhesive backing 18, and encapsulation of the inner border 34 with a chemically resistant material 17, such as an expanded fluorocarbon polymer with adhesive backing 19, employed in one embodiment of the invention. The corrugated gasket core 14 itself is typically constructed of metal material, preferably stainless steel (e.g., 304, 309, 310, 316, 321, 347, 410, 430, and 501 stainless steel). The selection of the metal depends upon the metallurgy of the flanges (or other surfaces) to be sealed, and the degree of chemical resistance desired from the metal gasket core. For example, metal gasket cores can be formed from Alloy 20, aluminum, brass, copper, Hastelloy B and C, Inconel 600, Incolloy 825, Monel, nickel, phosphor bronze, tantalum, and titanium.

In one embodiment, the graphite material is a flexible expanded graphite material, sold under the names "Grafoil®", "Sigraflex®" (Sigri GmbH), "Flexicarb®" or "Calgraph®", which is adhesively affixed to a Mylar material having a double-sided coating of a pressure sensitive adhesive material. It is preferred to employ a nuclear grade, at least about 95% pure graphite (carbon), having no binders or resins, and having less than 50 parts per million leachable chloride and/or fluoride content. The graphite/Mylar laminate is affixed to the exterior of the corrugated gasket core 14. The graphite material preferably conforms to, and maintains the corrugation contour, and extends beyond the outside edges of the core ring gasket to partially encapsulate the core gasket in the graphite material.

A wide variety of chemically resistant materials are compatible with the invention. The selection of the chemically resistant material may depend upon the chemical composition of fluids (i.e., liquids and/or gases, with or without solids) which may contact the gasket, and the temperature, pressure, or other operating conditions to which the gasket may be exposed. However, materials which are both resilient and chemically resistant are preferred. In one embodiment, the chemically resistant material is a fluorocarbon polymer which is adhesively affixed to a Mylar material having a double-sided coating of pressure sensitive adhesive material. Fluorocarbon polymers are characterized by their thermoplastic properties, resistance to chemicals, moisture, solvents, and oxidation, non-combustibility, and broad useful temperature range (i.e., up to 316° C.). The structure of fluorocarbon polymers comprises a straight back-bone of carbon atoms symmetrically surrounded by fluorine atoms.

Expanded fluorocarbon polymers such as polytetrafluoroethylene (PTFE), polyvinylidene fluoride, hexafluoropropylene, fluorinated ethylene-propylene polymers, and chlorotrifluoroethylene polymers are preferred because of their resilience, chemical resistance, low torque sealing, and limited cold flow or creep. These expanded fluorocarbon polymers may be sold under the names Teflon™, Halon™, Viton™, Gylon™, Intertex™, and Gore-Tex™. The characteristic of limited cold flow is particularly desirable in a gasket used in conditions where the seating stress of a flange may diminish over time. Thus, by encapsulating the inner diameter of the gasket with, for example, expanded PTFE, the initial seal created by tightening the bolts of the flange is maintained. Long term seal stability is especially important where fugitive emissions are sought to be reduced or eliminated (e.g., to reduce environmental impact).

Figure 3A:
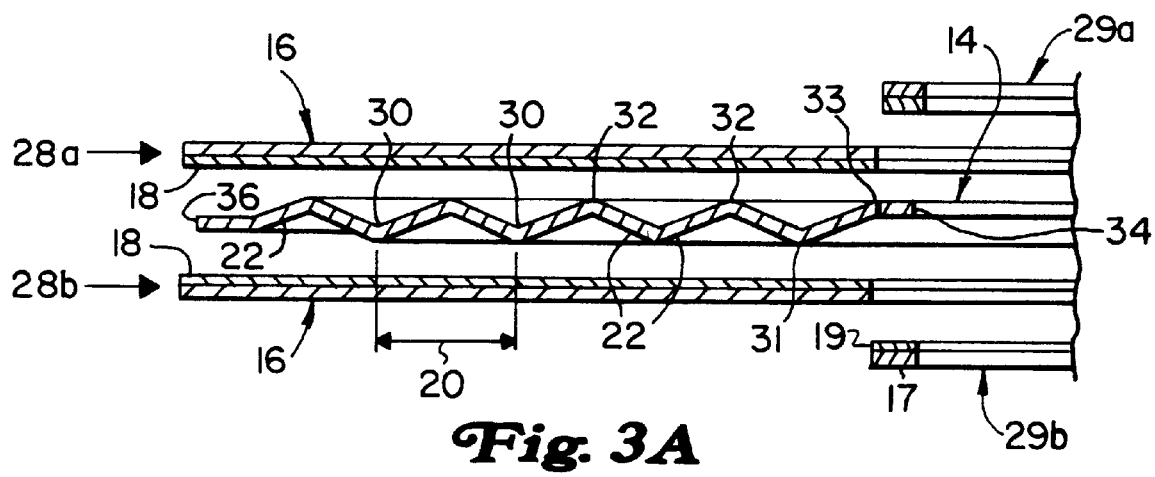
FIG. 3A is a partial cross-sectional view of a corrugated gasket in accordance with one embodiment of the invention.

FIG. 3A shows a partial cross-sectional view of a corrugated gasket core 14 prior to encapsulation of the outer border 36 with a graphite material 16, such as an expanded graphite with adhesive backing 18 and encapsulation of the inner border 34 with a chemically resistant material 17, such as expanded fluorocarbon polymer with adhesive backing 19 employed in one embodiment of the invention.

Figure 3B:
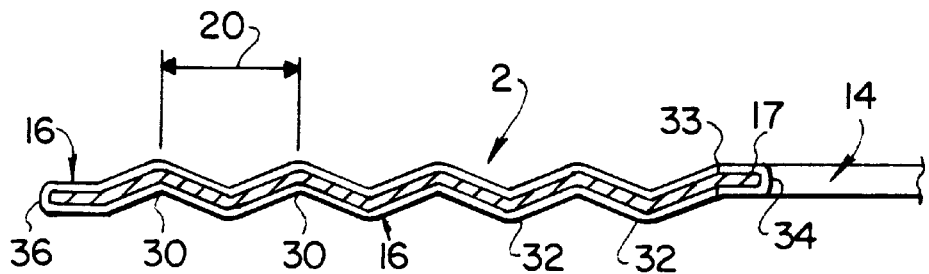
FIG. 3B is a partial cross-sectional view of the gasket of FIG. 3A after encapsulation.

FIG. 3B shows a partial cross-sectional view of a corrugated gasket of the invention 2 after encapsulation of the outer border 36 with a graphite material 16, such as an expanded graphite with adhesive backing 18 and encapsulation of the inner border 34 with a chemically resistant material 17, such as expanded fluorocarbon polymer with adhesive backing 19. FIGS. 3A and 3B illustrate "V-inverted V" shaped corrugations. However, the corrugations may also be a plurality of "V-inverted V" shapes, "U-inverted U" shapes, "W-inverted W" shapes, sinusoidal shapes, or other similar shapes or combinations thereof.

In the embodiment depicted in FIGS. 3A, 3B, and 4, the expanded graphite material 16 and the chemically resistant material 17 abut one another at the inner most peak 33 of gasket core 14. Alternatively, the relative amounts of expanded graphite material 16 and chemically resistant material 17 may be altered such that they abut elsewhere along the surface of gasket core 14. Moreover, in another alternative embodiment, expanded graphite material 16 and chemically resistant material 17 may not abut along the surface of gasket core 14, but instead extend from the outer border 36 and the inner border 34, respectively to encapsulate only a portion of the gasket core 14.

FIG. 4 shows a partial cross-sectional view of a corrugated gasket 2 after encapsulation of the outer border 36 with a graphite material, such as an expanded graphite 16 with adhesive backing 18 and encapsulation of the inner border 34 with a chemically resistant material 17, such as expanded fluorocarbon polymer with adhesive backing 19 employed in another embodiment of the invention. In this alternative embodiment, the corrugation are of a sinusoidal pattern.

Referring again to FIGS. 1, 2, 3A, and 3B, a ring gasket 2 of this invention was constructed for use in a 3-inch, 150 lb raised pipe flange, such as that illustrated in FIG. 1. In this configuration, the gasket is preferably designed to cover substantially the entire surface of the raised flange 12. In this embodiment, the raised face flange dimensions are 5⅜ inches O.D.×3½ inches I.D. The ring gasket 2 was constructed from a 0.024-inch 316 stainless steel core 14 that was corrugated such as illustrated in FIGS. 2, 3A and 3B, and encapsulated in graphite 16 and fluorocarbon polymer 17 as described below. In this embodiment, the preferred corrugation width 20 is ³⁄₃₂ inch, and is defined as the distance between adjacent ridges, peaks or apexes 32. Furthermore, in this embodiment, the preferred corrugation angle or pitch 22 is 45°.

This flange ring gasket was manufactured in accordance with the following method.

(1) The 0.024-inch thick (uncorrugated) 316 stainless steel was cut to a square size having a diagonal length at least equal to the desired gasket O.D. minus ⅛; thus, the diagonal length was at least 5⅝ inches.

(2) The square of 0.024-inch steel was then center punched (not shown).

(3) The square was then circle-sheared to cut out a circle (not shown) having a diameter equal to ⅛ of an inch less than the desired gasket O.D.; thus, the diameter of this circle was 5⅝ inches.

(4) The 0.024-inch thick, 5⅝ inch diameter circle was then corrugated, using a spinning roller system having male and female dies of the same pitch and height (not shown) to create the "V-inverted V" shaped corrugations illustrated in FIGS. 3A and 3B, having a corrugation width 20 of ³⁄₃₂ inch and a corrugation angle 22 of 45°. In this embodiment, the corrugations are designed to form a plurality of concentric, circular, parallel rings defined by the ridges, peaks, or apexes 32 and the hollows, troughs, or valleys 30, which, in the case of a pipeline flange gasket 2, are concentric with the circumferential inner border 34 and outer border 36 of the gasket core 14.

(5) The corrugated, 5⅝ inch diameter circle was again circle-sheared to cut out an inner circle, thereby leaving a ring 14 having an outer diameter 24 of 5⅝ inches, and an inner diameter 26 of ⅛ inch greater than the desired gasket I.D.; thus, the inner diameter 26 of the corrugated stainless steel ring 14 was 3⅝ inches in diameter.

(6) Expanded graphite sheet material 16 (e.g., the 0.020" thick "Calgraph®" or "Flexicarb®" expanded graphite sheet) was obtained, and a pressure sensitive double-sided adhesive 18 (having Mylar backing, 0.002" thick) was applied to the expanded graphite material 16. The double-sided adhesive 18 typically is available in sheets containing quick-release, peel-off layers on both sides to protect the adhesive until use.

(7) The expanded graphite/adhesive composite was then die stamp cut with a Rule Steel die (not shown) having the desired dimensions (here, 5⅜ inches O.D.×4⅛ inches I.D.) to create two matching ring-shaped graphite/adhesive laminates 28a and 28b.

(8) The corrugated metal core 14 was then encapsulated from the outer border 36 to the inner most trough 31 with the expanded graphite by laminating and molding both sides of the core material 14 with the laminate layers of 0.022-inch thick adhesive-backed expanded graphite 28a and 28b. A first ring-shaped laminate layer, e.g., 28a, was symmetrically and proportionally aligned with the metal core 14 such that ¹⁄₁₆ inch of the laminate 28a extends over the outer border 36 of the metal core. Sufficient pressure was applied to the first laminate layer 28a to adhere it to the core and to maintain such alignment with the core 14 until the second laminate layer 28b was applied. The second laminate layer 28b was applied in similar fashion to the opposite face of the metal core 14.

(9) The laminated gasket 2 was then placed between two foam/cloth padded rollers (not shown). Compression was applied to the rollers, and the gasket 2 was rotated around the rollers in circular fashion to mold and compress the adhesive-backed graphite laminates 28a and 29b into the individual corrugations (i.e., the area defined by the ridges, peaks, or apexes 32 and the hollows, troughs, or valleys 30), such that the graphite layers 28a and 28b adhere to the corrugated core 14 and maintain the contour of the corrugation.

(10) Pressure was next applied to the ¹⁄₁₆th inch overlap of the graphite laminate layers 28a and 28b along the O.D. of the corrugated metal core ring gasket 2 to seal the graphite laminate layers together, thereby ensuring complete encapsulation of the outer border 36 of the core material with graphite.

(11) Expanded PTFE sheet material 17 (e.g., 0.039" thick Gore-Tex™ expanded PTFE sheet) was obtained, and a pressure sensitive double-sided adhesive 19 (having Mylar backing, 0.002" thick) was applied to the expanded PTFE material 17. The double-sided adhesive 19 typically is available in sheets containing quick release, peel off layers on both sides to protect the adhesive until use.

(12) The expanded PTFE/adhesive composite was then die stamp cut with a Rule Steel die (not shown) having the desired dimensions (here, 4⅛ inches O.D.×3½ inches I.D.) to create two matching ring-shaped PTFE/adhesive laminates 29a and 29b.

(13) The corrugated metal core 14 was then encapsulated from the inner border 34 to the inner most peak 33 with the expanded PTFE material 17 by laminating and molding both sides of the core material 14 with the formed laminate layers of 0.041-inch thick adhesive backed expanded PTFE material 29a and 29b. A first ring-shaped laminate layer, e.g., 29a, was symmetrically and proportionally aligned with the metal core 14 such that ¹⁄₁₆ inch of the laminate extends over the inner border 34 of the metal core 14. Sufficient pressure was applied to the first laminate layer 29a to adhere it to the core and to maintain such alignment with the core 14 until the second laminate layer 29b was applied. The second laminate layer was applied in similar fashion to the opposite face of the metal core 14.

(14) The gasket was again placed between the rollers (now having fresh foam and cloth to prevent graphite contamination of the PTFE laminates) and the adhesive-backed PTFE laminates 29a and 29b were molded and compressed such that they adhered to the corrugated core 14.

(15) Pressure was then applied to the 1/16th inch over-lap of the PTFE laminate layers 29a, 29b along the I.D. of the corrugated metal core ring gasket 2 to seal the PTFE laminate layers together, thereby ensuring complete encapsulation of the inner border 34 of the core material with PTFE.

As an additional step to the above-described method, it may be desirable to apply heat to the gasket surface sufficient to carbonize the Mylar or other suitable backing of the expanded graphite and PTFE laminate layers.

Referring now to FIGS. 5A–5D, there is illustrated an application of an embodiment of a gasket employed in a raised flange pipeline connection.

Figure 5B:
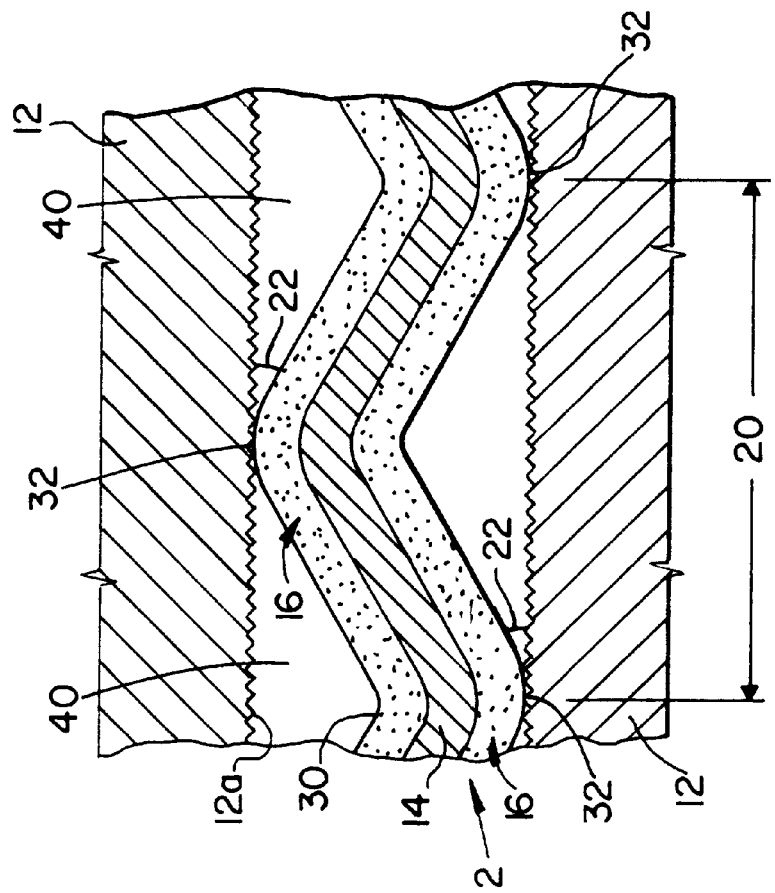
FIGS. 5A, 5B, 5C, and 5D are partial cross-sectional views of a corrugated, graphite and fluorocarbon polymer encapsulated gasket according to one embodiment of the invention, employed between two flange surfaces.
Figure 5A:
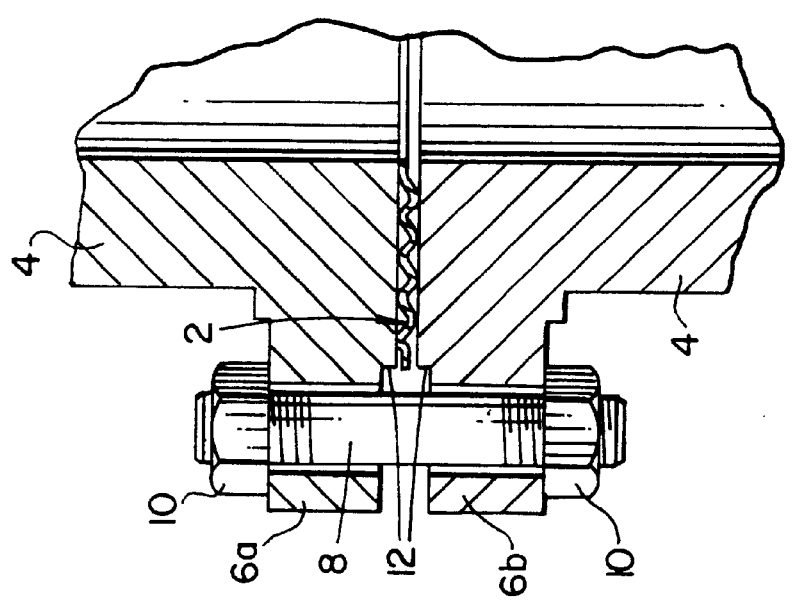

In particular, FIG. 5A shows a partial cross-sectional view of a corrugated, graphite and fluorocarbon polymer encapsulated gasket 2 in accordance with an embodiment of the invention employed between two flange surfaces 6a, 6b prior to compression loading. FIG. 5B shows an enlarged, partial cross-sectional view of the same. In this example, the raised flange face 12 has a rough, serrated, or RMS finish 12a. The corrugation width 20, as defined by the distance between adjacent ridges, peaks, or apexes 32 at its original design distance, is 3/32 inch and the preferred corrugation angle 22 is 45° relative to the raised flange surfaces 12. In the uncompressed, or unloaded position, the graphite layer 16 retains a substantially uniform thickness and density over the contoured surface of the corrugated core 14. The flange surfaces 12 are encapsulated at the corrugation apex points 32 to form a plurality of independent, fluid tight, sealed chambers 40 across the surface to be sealed following compression loading of the flange surface (see FIGS. 5C and 5D).

Figure 5D:
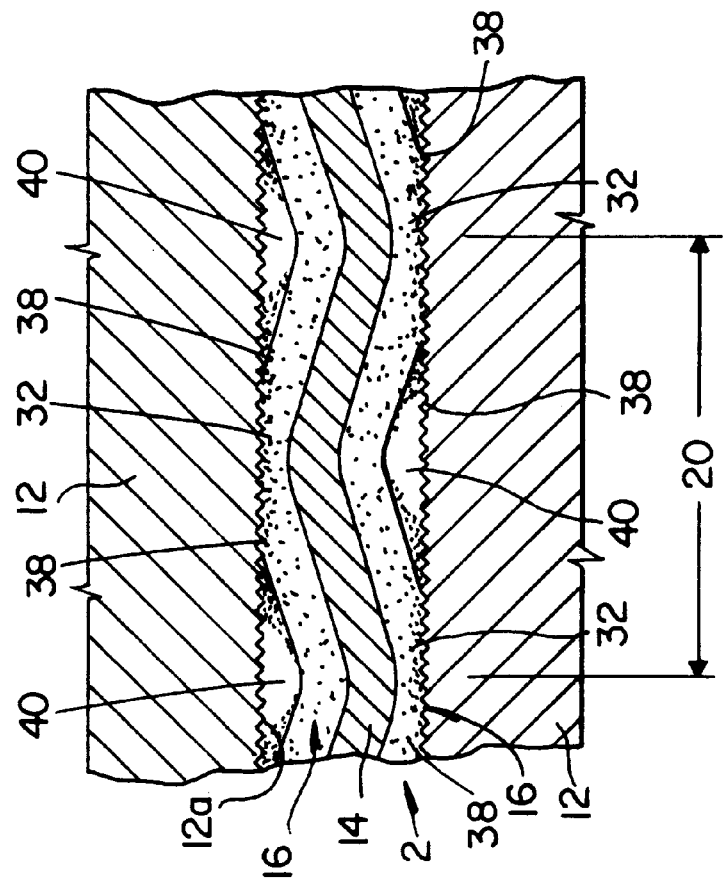
Figure 5C:
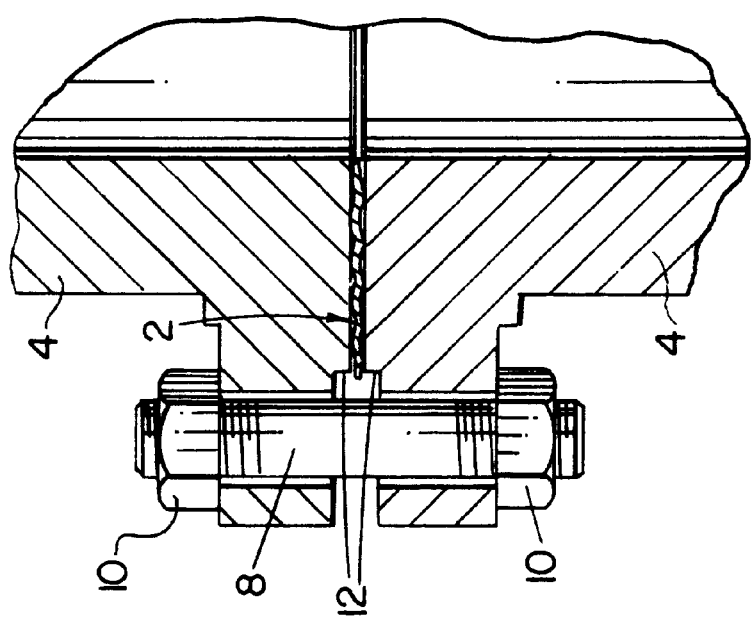

FIG. 5C shows a partial cross-sectional view of a corrugated, graphite and fluorocarbon polymer encapsulated gasket 2 in accordance with an embodiment of the invention and employed between two flange surfaces 6a, 6b during compression loading. FIG. 5D shows an enlarged partial cross-sectional view of the same. The graphite and fluorocarbon polymer encapsulated corrugated ring gasket 2 shown in FIGS. 5C and 5D has been installed into a pipeline flange 6a, 6b, with a relatively minimal torque (e.g., 30 ft-lbs for a 3', 150 lb flange) applied to the flange bolts sufficient to urge and compress the gasket into a "loaded" static position between the now closer adjacent flange surfaces 12. As the flange connection is tightened, and the flange surfaces move toward one another, the corrugation distance 20 increases while the corrugation angle 22 decreases. This loading action sets multiple apex sealing faces 32 of the ring gasket into sealing relation with the flange surfaces 12. In the loaded position, the corrugation on both faces of the ring gasket form a plurality of parallel, fluid tight, concentric barriers or chambers 40 to prevent leakage of the flanged pipe connection during operation. In the compressed or loaded state, the gasket energizes the multiple apex sealing faces 32 by creating zones of increased graphite density 38 surrounding the concentric apex sealing faces 32. The graphite densification may substantially fill or saturate the now decreased barrier zone 40 creating essentially a series of independent, back-to-back rings of highly densified graphite over the entire surface of the flange seal. Thus, in this static, loaded position, the seal is in an energized mode, creating a multiplicity of concentric, fluid tight, barriers or chambers 40 to ensure fail-safe seal operation. Moreover, the low torque sealing capability of the expanded PTFE laminate provides an initial fluid seal having limited cold flow or creep and a chemically resistant barrier between the fluid within the pipeline and the multiple concentric barriers 40 formed by compression of the expanded graphite laminate.

Referring again to FIGS. 2, 3A and 3B, as the energized ring gasket 2 of this embodiment is subjected to temperatures in excess of the temperature stability point of the Mylar backing of the adhesive layers 17 and 18 of the graphite and fluorocarbon laminates 16 and 19, these layers become carbonized, thereby becoming part of the gasket.

Referring again to FIGS. 5C and 5D, as the flange connection 6a, 6b becomes subjected to thermal excursions, cycling or shock, the flange connection, and the energized, corrugated seal multiplex gasket system 2 contained therebetween are expected to encounter thermal expansion and contraction. However, unlike prior gasket systems, this gasket 2 uses the interactive relationship between the corrugated core 14, the zone-densified graphite encapsulation 16, the fluorocarbon polymer encapsulated inner border (not shown), and the flange surfaces 12 to maintain a sealed flange before, during, and after exposure to thermal cycling events. More specifically, at elevated temperatures under an applied load, the fluorocarbon polymer will expand in width and length, lose resiliency, and undergo cold flow. However, the action of the corrugations in trapping the cold flowing polymer compensates for the loss of resiliency and maintains an effective seal. This trapping action is enhanced by the ability of the compressed corrugated core to exert a spring action force against the opposing flange surfaces. Thus, it has been found that this gasket system achieves fail-safe sealing with only a fraction of the previously required torque, and further dispenses with the need to frequently tighten the flange connections to maintain positive sealing under operational conditions.

It has also been found that this hybrid gasket system out-performed gaskets encapsulated only with graphite (e.g., as described in U.S. Pat. No. 5,421,594) during fire test conditions and further passed hydrostatic testing after cool-down from a series of thermal cycles (Table I).

The fire test consisted of a modified American Petroleum Institute (API) Standard 607, Fourth Edition Fire Test. The gaskets were installed between two "6"-ANSI 300 flanges. The flanges were secured with B7 bolts torqued to 60% of yield (e.g., 200 ft/lbs). One thermocouple was installed in one flange at the 3:00 o'clock position and a another thermocouple was installed in the opposite flange at the 9:00 o'clock position. At least three thermocouples were required to reach 1200° F. for 15 minutes. The flange seal was tested at 110% hydrostatic pressure to assure that there were no leaks.

The heat-up, cool-down, and duration of the fire test were in accordance with API-607, Fourth Edition. Any leakage was observed and recording during both the fire test and cool-down periods. Leakage tests were performed at 30, 50, 100, 200, 300, and 700 psig. Pressures were maintained for a period of five minutes and leakage was measured throughout. The acceptable leakage rate for this test was 150 ml/min. during the 30 psig test only.

TABLE I

FIRE TEST LEAKAGE OF GRAPHITE AND GRAPHITE/Gore-Tex ™ GASKETS

Leakage Rate (ml/min.)

| Condition | Graphite Gasket | | Graphite/Gore-Tex ™ Gasket | |
|---|---|---|---|---|
| | Side A | Side B | Side A | Side B |
| Leakage during Burn | 0 | 0 | 0 | 0 |
| After Burn @ 30 psig | 34.6 | 25.6 | 0.4 | 4.8 |
| After Burn @ 50 psig | 48.0 | 32.4 | 1.2 | 4.8 |
| After Burn @ 100 psig | 170.0 | 16.0 | 1.0 | 7.2 |
| After Burn @ 200 psig | 102.0 | 39.6 | 15.2 | 16.4 |
| After Burn @ 300 psig | 250.0 | 50.0 | 26.4 | 18.0 |
| After Burn @ 700 psig | 26.0 | 18.0 | 18.4 | 8.8 |

The results demonstrate the improved gasket performance (i.e., reduced leakage) afforded by encapsulating the inner diameter of the gasket with an expanded fluorocarbon polymer laminate.

When compared to gaskets encapsulated with only graphite, the hybrid gasket also performed favorably in tests of room temperature tightness and room temperature crush resistance from which the gasket constants shown in Table II were calculated.

The room temperature tightness (ROTT) test procedure is documented in the proposed ASTM Draft No. 9 of the "Standard Test Method for Gasket Constants for Bolted Joint Design." The ROTT test used a gasket load sequence from stress levels 1025 psi to 15160 psi, part A, which is interrupted at stress levels 8090 psi, 11630 psi, and 15160 psi to run unload-reload sequences, parts B1, B2, and B3. Leakage was measured with helium at pressures of 400 and 800 psig during part A at stress levels of 1025, 4560, 8090, 11630, and 15160 psi. The leakage measurements at all other steps of the test were taken with helium at 800 psig only. Gasket stress values in the ROTT test were computed based on the initial gasket area (before loading). Any increase in gasket area upon loading was not taken into account in the computation. Gasket deflection (i.e., gasket thickness loss in inches) and the tightness parameter were measured for each gasket at a given gasket stress level.

Any specific measure of mass leak rate is strongly correlated to the applied fluid pressure. To permit the comparison of the leakage behavior of gaskets tested at different fluid pressures, the effective pressure must be taken into account. Thus, the tightness parameter, $T_p$, relates a given measured value of leak rate to the pressure at which this leak rate was actually obtained. $T_p$ was developed so that at a given state of condition of a gasket, the same tightness value would be obtained whether leakage is measured with fluid pressurized at 200, 400, 800 psig or any other pressure.

$$Tp = \frac{P}{P^*}\left(\frac{Lrm^*}{Lrm}\right)^{0.5}$$

where: 
$P$ = Fluid pressure (MPa or psig)
$P^*$ = Reference pressure (0.101 MPa or 14.7 psig)
$Lrm$ = Mass Leak Rate (mg/s)
$Lrm^*$ = Unit Mass Leak Rate (1 mg/s for a 150 mm O.D. gasket in a joint).

Tp is proportional to pressure and inversely proportional to the square root of leak rate. Therefore, a higher value of $T_p$ means a tighter joint. Because of the square root, a joint that is 10 times tighter leaks 100 times less.

A room temperature CRUSH resistance tightness test was conducted on the gaskets following the ROTT test. The crush test consists of applying very high compression loads to a gasket to evaluate both its mechanical and leakage resistance to excessive compression. The procedure consists of cycling the gasket from a minimum stress of 1025 psi up to the required maximum stress in increments of 5000 psi with helium at a pressure of 400 psig. Gasket deflection and leakage are measured after every 5000 psi stress increment.

At the end of the ROTT test, the gasket was at the 1025 psi stress level and the pressure was at 800 psig. The pressure was then set to 400 psig and a leakage measurement was taken. The gasket specimen was then loaded to a stress level of 1500 psi and gasket deflection and leakage measurements were once again taken. The gasket specimen was unloaded to a stress level of 1025 psi and gasket deflection and leakage measurements were again recorded. The compressive stress was then increased to the value of the previous highest stress level incremented by 5000 psi. Gasket deflection and leakage were once again recorded. Gasket unloading and reloading were subsequently repeated until the required maximum gasket stress was achieved. Gasket deflection and tightness parameter were measured as described previously for the ROTT test.

Upon initial seating, gasket tightness normally increases for increasing gasket stress. This results in a convex "knee" in Part A of the ROTT test. That is, the slope of a log—log plot of gasket stress, Sg versus tightness parameter, Tp, decreases with increasing Sg. Some gaskets have well defined knee while others have a knee that is fuzzy and less well defined. In some cases, increasing levels of gasket load have returned proportionately smaller increases in tightness than previously so that there is a reverse knee where the scope of a log—log plot of Sg versus Tp increases with increasing Sg. This later case is called tightness hardening.

After sealing, when a gasket is unloaded, a path of stress versus tightness is followed that is different from the seating path. The so called Part B unloading line defined by this path is steeper and relatively straight on a log—log plot of Sg versus Tp. If the gasket is reloaded, the Sg-Tp line essentially follows the unloading line with some hysteresis. If unloading is done at various seating stress levels, it is found that most often the lines follow a pattern of from more vertical to less vertical as the seating stress level increases. It is also observed that usually these lines tend to converge at a point that is low and on the left on the Sg-Tp plot.

The gasket constants idealize the tightness response of a gasket to stress excursions. Gasket constants $G_b$ and "a" together represent the capacity of the gasket to develop tightness upon initial seating. They express the relationship between the gasket initial seating stress and the gasket tightness as a line on a log—log plot. The combined effect of $G_b$ and "a" is best represented by the value of $S_{T_p}=G_b \times T_p^a$ calculated for typical values of $T_p$ such as 100 or 1000. For example $S_{1000}=G_b(1000)^a$. Low values of $G_b$ and "a" are favorable.

It is worth noting that $G_b$ and "a" are unique to a material only for a specific set of standard test conditions. The maximum test stress, the specific procedure load sequence, and the leak sensitivity of the test fixture are factors that affect $G_b$ and "a" for a particular material. To a lesser extent the test fluid and pressures will also affect the value of $G_b$ and "a" for a material. Valid comparisons of Gb, "a" and Gs were ensured for this project by keeping the procedure variables constant in this respect.

Also, the finding of a tightness limit because of tightness hardening means that the gasket constants Gb and "a" would be essentially the same if a load sequence with a higher maximum load was used. That is to say that a higher maximum load will change the constants Gb and "a" except for materials that exhibit tightness hardening.

$G_s$ is an independent constant which represents operations. It characterizes the gasket tightness sensitivity to operating bolt load reductions which occur during pressurization, gasket creep, or thermal disturbances that cause load loss. Constant $G_s$ idealizes the relationship between gasket stress and gasket tightness during stress excursions as being linear on a log—log plot. However, $G_s$ does not represent a unique relationship; it is dependent of the initial seating stress level. A low value of $G_s$ is favorable.

When there is Tightness Hardening, a tightness limit, Tps, and a corresponding stress limit, Ss, are reported. Tps represents the practical maximum tightness that can be achieved.

Two additional items of important ROTT test information are the values found for Tpmax and Tpmin. Tpmax is simply the highest level of tightness achieved during the test. If there is a tightness limit because of tightness hardening, then Tpmax will be essentially the same as Tps which is independent of the maximum load of the test procedure. Without tightness hardening, the value of Tpmax obtained for a material will depend on the maximum gasket stress of the test. A high Tpmax is favorable. In the context of ROTT tests, Tpmin is the lowest tightness found for a material in any Part B (unload-reload) cycle. A high Tpmin is also favorable.

TABLE II

GASKET CONSTANTS

| Gasket | Gb (psi) | a | Gs (psi) | $S_{100}$ (psi) | $S_{1000}$ (psi) | $S_{3000}$ (psi) | $S_{10000}$ (psi) | Ss (psi) | Tps | Tp$_{min}$ | Tp$_{max}$ |
|---|---|---|---|---|---|---|---|---|---|---|---|
| [a]Graphite | 922 | .248 | 5.10 | 2889 | 5114 | ND | 9052 | N/A | N/A | ND | 55493 |
| [b]Graphite/Gore-Tex ™ | 741 | .272 | .037 | 2593 | 4851 | 6540 | 9074 | N/A | N/A | ND | 110685* |
| [c]Virgin Teflon ™ | 26.7 | .514 | 3.33E − 12 | 285 | 932 | ND | 3043 | 5578 | 32506 | 17261 | 32506 |
| [d]Glass-filled Teflon ™ | 462 | .251 | 2.13E − 01 | 1467 | 2614 | ND | 4657 | 6318 | 33720 | 4213 | 33729 |
| [e]Tex-o-ton ™ | 695 | .189 | 5.40E + 1 | 1658 | 2559 | ND | 3952 | 5045 | 36505 | 67 | 36505 |
| [f]Gore-Tex ™ | 358 | .334 | 2.37E − 01 | 1667 | 3597 | ND | 7761 | N/A | N/A | 1413 | 35070 |
| [g]Laminated Graphite-1 | 1400 | .330 | 0.10 | 6225 | 13126 | ND | ND | ND | ND | ND | ND |
| [h]Laminated Graphite-2 | 816 | .380 | .07 | 4631 | 11033 | ND | ND | ND | ND | ND | ND |
| [i]Flexible Graphite | 970 | .380 | .05 | 5686 | 13765 | ND | ND | ND | ND | ND | ND |

Where:
[a]Graphite encapsulated corrugated metal core;
[b]Graphite and Gore-Tex ™ encapsulated corrugated metal core;
[c]Virgin PTFE gasket, no metal core;
[d]25% Glass-filled virgin PTFE, no metal core;
[e]Virgin PTFE encapsulated perforated metal core;
[f]Expanded PTFE, no metal core;
[g]Laminated graphite encapsulated stainless tanged core;
[h]Laminated graphite encapsulated stainless foil core;
[i]Flexible graphite, no metal core;
ND = no data collected;
N/A = met or exceeded maximum resolution of the test;
*Maximum tightness achievable with this test.

Comparison of gasket constants and Tp values provides a numerical method of identifying differences in tightness, bolt stress requirements, the ability of the gasket to withstand bolt load loss, and the general performance capability of each gasket. The results of Table II demonstrate that the performance of the hybrid gasket met or exceeded that of the graphite encapsulated gasket. For example, initial seating capability of the hybrid gasket was comparable to that of the graphite encapsulated gasket. In addition, the hybrid gasket showed a markedly reduced sensitivity to unloading as compared to the graphite encapsulated gasket. Moreover, the hybrid gasket showed no tightness hardening under these test conditions. These data attest to the fact that the hybrid gasket has achieved the highest total tightness and lowest leakage rate of any graphite encapsulated gasket yet manufactured.

In addition to its enhanced performance characteristics, the expanded graphite and fluorocarbon polymer encapsulated gasket also provides several ancillary benefits. For example, the expanded fluorocarbon polymer laminate provides those handling and installing the gasket protection from being cut by the metal core of the gasket. Similarly, the polymer laminate protects the graphite laminate from being chipped or otherwise damaged during field storage on nails, pegs, or other supports. Because such a gasket has nearly universal applicability (e.g., resistance to a wide range of chemicals, pH, and temperatures), it serves to minimize the different types of gaskets normally purchased, stored, and handled by workers in the industry. The universal applicability also reduces the risk and consequences of installing the wrong gasket. By using a limited number of gaskets having a broad range of applications, the likelihood of mistakenly installing the wrong type of gasket, with resulting catastrophic consequences, is diminished. Moreover, even if such a gasket is installed in the wrong application (e.g., exposed to excessive temperature), the enhanced sealing capabilities of the gasket following a fire or other cause of polymer laminate destruction further reduces the likelihood of a catastrophic result.

It will be apparent to those skilled in the art that other suitable mechanical means may be employed for creating the corrugations on the gasket core 14. For example, in addition to the spinning roller method described, milling, molding, stamping, and other techniques may be employed to create the corrugation. It will likewise be apparent to those skilled in the art that other suitable corrugation shapes may be employed for creating the corrugation on the gaskets. For example, in addition to the "V"-shaped corrugations shown in FIGS. 3A–3B, and 5A–5D, and the sinusoidal shaped corrugation shown in FIG. 4, any corrugation shape giving the material to be corrugated increased resiliency, ductility, memory, and springiness could be employed.

In addition, multiple apertures, with or without corrugations in laterally spaced, parallel relationship relative to the gasket border, may be created. Moreover, the circumferential shape of the gasket and the shape of the gasket aperture of this invention are not limited to circles. For example, gaskets having an outline and/or aperture defining any shape, for example, oval, square, rectangular, triangular, elliptical, oblong, epicycloid, and/or any combination thereof, may be used. While a circular ring shape 2 is the desired gasket shape for use on a pipe flange, other gasket shapes can be manufactured depending on the shape of the surfaces to be sealed. Furthermore, although FIGS. 1, 5A, and 5C illustrate a gasket of this invention used in a raised flange pipeline connection, other variations of this gasket are possible to accommodate differing flange connection scenarios. For example, a pipeline flange gasket of the invention can be employed where the flange connection requires the gasket to extend diametrically beyond the flange bolt holes.

Other graphite products may also be employed, such as the 0.020-inch thick "Grafoil®" product which is available with a 0.002-inch Mylar adhesive layer on one side. Other means are available for adhering the graphite and fluorocarbon polymer to the corrugated core, such as by compression molding techniques, or other adhesive techniques. Although a Mylar material with pressure sensitive adhesive on both sides is useful for its temperature stability and carbonization characteristics, other suitable adhesives could be employed.

As described above, the uncorrugated core metal thickness may be 0.024 inch, the corrugation peak width may be 3/32-inches (for a 3", 150 lb flange), and the corrugation angle may be 45°. However, a wide variety of combined core material thicknesses, corrugation peak widths, graphite layer thicknesses, and fluorocarbon polymer layer thicknesses are within the scope and spirit of this invention. For example, gaskets may include core material thicknesses of 0.010–0.030 inches; corrugation peak widths of 3/32–5/32 inches; graphite layer thicknesses of 0.015–0.030-inch (with an additional 0.002-inch adhesive); and fluorocarbon polymer layer thicknesses of 0.020–0.062-inch (with an additional 0.002-inch adhesive). For example, in pipe flange connections having ¼" to ½" flange face widths or ½" to 3½" flange I.D., it is preferred that the corrugation width 20 be 3/32". For pipe flange connections having 9/16" or greater flange face widths or 4" or greater flange I.D., the preferred corrugation width 20 is 5/32". Moreover, the absolute and relative widths of the expanded graphite and fluorocarbon polymer layers may be varied depending upon the expected operational conditions and the particular polymer used. For example, the width of these materials may be influenced, in part, by the amount of graphite required to maintain a fire-safe seal following gas-off of the polymer in the event of a fire.

The beneficial multi-sealing characteristics of the corrugated, graphite and fluorocarbon polymer encapsulated gasket of this invention also have application in irregularly-shaped configurations, such as those required for heat exchanger gaskets, or other shape requirements, such as, oval, square, rectangular, triangular, elliptical, oblong, and/or epicycloid shaped gaskets, and/or any combination thereof. For example, heat exchanger gaskets typically have a circular outer diameter and inner diameter, similar to a pipe flange gasket, but additionally contain partitioned chambers within the confines of the inner diameter area of the gasket.

Figure 6A:
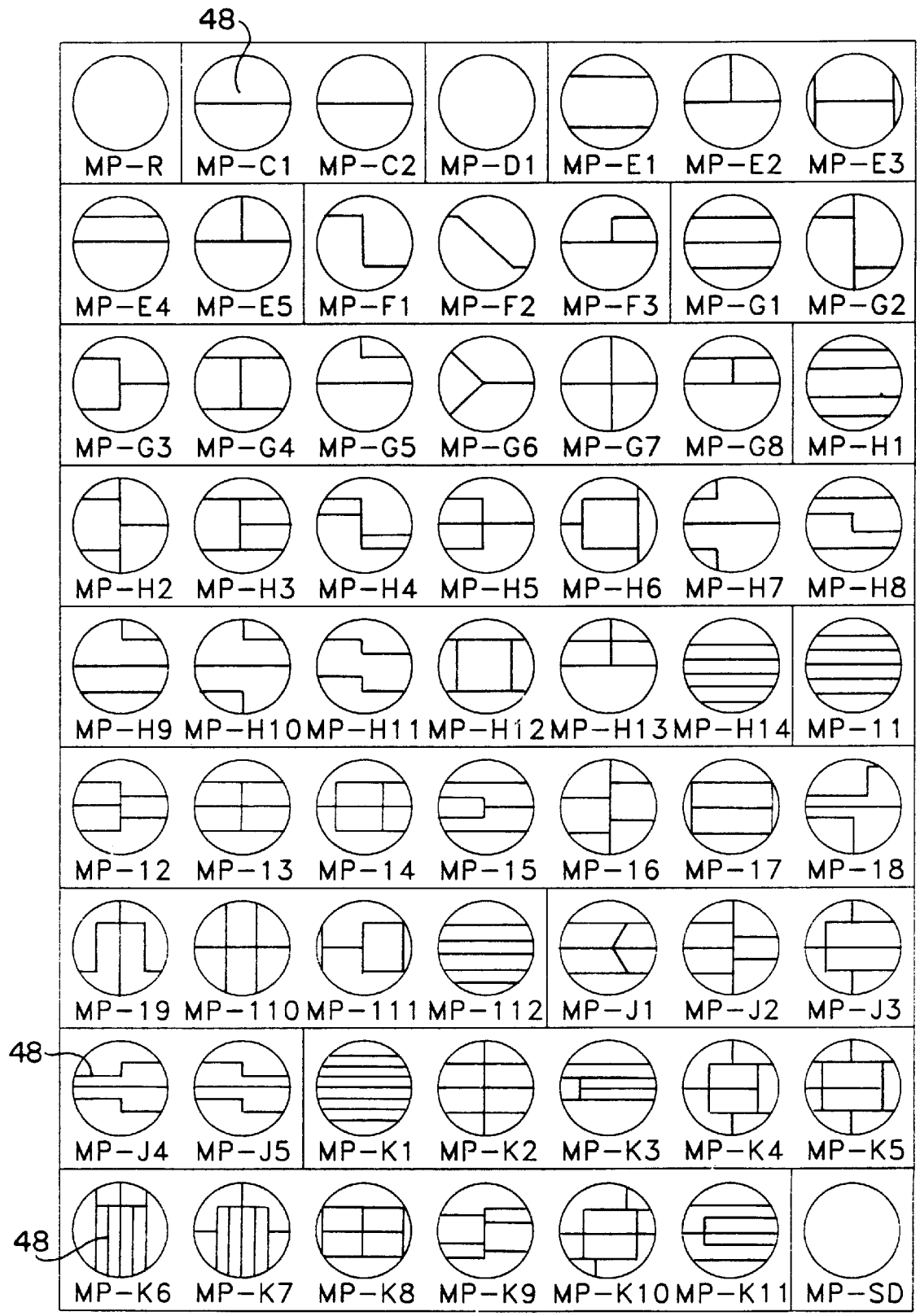
FIG. 6A shows a selection of heat exchanger gasket configurations in accordance with various embodiments of the invention.
Figure 6B:
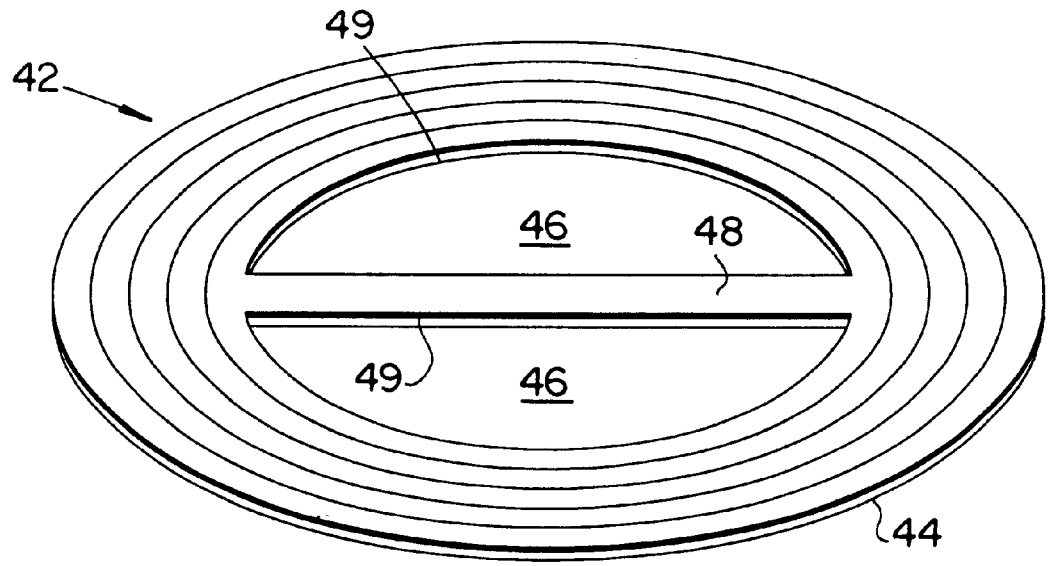
FIG. 6B is a top view of a heat exchanger gasket made according to one embodiment of the invention.

Referring now to FIG. 6A, there is shown a selection of heat exchanger gasket configurations which are applicable to a gasket made according to the invention. FIG. 6B illustrates an example of a heat exchanger gasket made in accordance with the invention. Thus, similar to the method described above, in another embodiment of the invention, a corrugated, multi-chambered barrier heat exchanger seal 42 is created by, for example, circular shearing a desired core material, (such as 0.024-inch thick 316 stainless steel), corrugating the outer diameter ring 44 of the gasket over the desired seal width, and then cutting the remainder of the core material to leave the desired seal configuration for the partitioned heat exchanger chambers 46 (as defined by one or more ribs 48) within the confines of the inner diameter area of the gasket. The gasket 42 can then be encapsulated in graphite and fluorocarbon polymer according to the methods of the invention. The fluorocarbon polymer being applied to both the inner border 49 and the rib 48. In one embodiment, the fluorocarbon polymer covers at least about 50% of the rib surface area. If only the outer diameter portion of the heat exchanger gasket 44 is corrugated, then it may be necessary to use a thicker layer of fluorocarbon polymer material on the noncorrugated rib portion 48 and the inner border 44 of the gasket to achieve a uniform seal height.

Figure 6C:
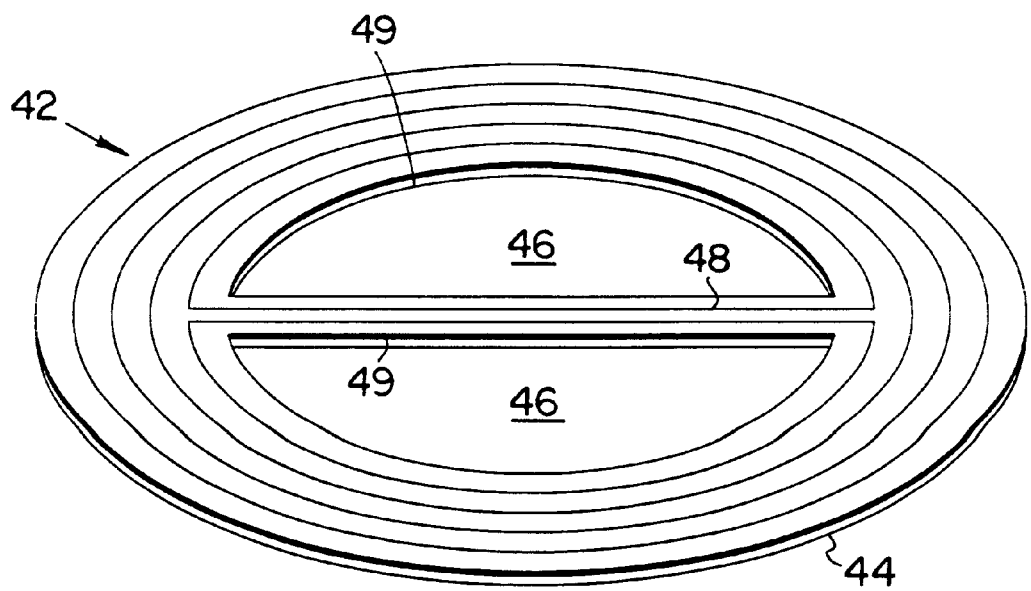
FIG. 6C is a top view of a heat exchanger gasket made according to one embodiment of the invention.

Referring now to FIG. 6C, in another alternative heat exchanger gasket embodiment, the rib portion 48 is corrugated along with the outer diameter portion of the ring portion of the gasket 44 to create fluid-locked, parallel, laterally spaced corrugations surrounding the heat exchanger chambers 46 and extending concentrically to the outer diameter of the gasket, as shown, or in a similar configuration. Although a wide range of corrugation widths (e.g., ⅛", 3/32", 5/32", 3/16", and ¼") may be used, in heat exchanger flange connections having ¼" to 6" flange face widths, it is preferred that the corrugation width 20 be 5/32".

The above-described gasket systems, and other custom gasket configuration shapes, can be made according to the invention by creating a die-stamp, or other mechanism, to stamp or indent, or machine sheet metal with a series of corrugations parallelling the opening to be sealed, and then encapsulating such custom designed corrugated gasket in graphite and fluorocarbon polymer in accordance with the invention.

Among the advantages of the invention are: it is a non-asbestos gasket; it can withstand high pressures; it can withstand high temperatures; it requires relatively low torque to create a positive seal; it is chemically resistant; it is field rugged; it is reusable; it is fire resistant; and it has great resilience, memory and structural integrity (particularly with thermal cycling from high temperatures to low temperatures and vice versa).

For example, with existing flange gaskets used in the petrochemical industry, typically 150 ft-lbs of torque is required for the bolts on a 3 inch-150 lb flange correction to achieve a positive seal. This typical torquing value places a high level of stress and strain on the flange and flange bolts potentially leading to expensive repairs or seal failure. However, the ring gasket of the invention minimizes the potential for flange damage by requiring only approximately 20% (i.e., 30 ft-lbs) of the normal torque presently applied in the industry to achieve a positive seal with existing gaskets. In light of these advantages, the flange bolts last longer; damage to the flanges or other seal surfaces is minimized; and less labor is required for the installation of the ring gaskets and maintenance of the flange connections, thereby creating a long lasting, reliable, and fail-safe seal.

For example, a flange which has a 7¼ inch outer diameter is typically constructed with only four bolt holes. This particular size flange is one of the most commonly used, and when employing existing gaskets, too much torque is required to create a positive seal, thereby warping and damaging the flange and the flange bolts. Therefore, the low-torque, graphite and fluorocarbon polymer encapsulated, corrugated ring gasket of the invention overcomes this and other disadvantages.

Even if over-torquing occurs, another built-in advantage of the ring gasket of the invention is its crush resistance, thereby ensuring performance and enhancing the potential for reusability of the gasket even in the situations of over-torquing.

Furthermore, the properties of the corrugated core ring gasket encapsulated with graphite and fluorocarbon polymer, provide fail-safe operation thereby avoiding potential damage to human health, plant equipment, and the surrounding environment. The multi-sealed ring gasket system of the invention has great fire resistance, which can help avert a catastrophe in the event of a fire external to the seal. The ring gasket of this invention has great chemical resistance by virtue of the fluorocarbon polymer encapsulation and the material selected for the corrugated core gasket. The ring gasket of the invention also provides field ruggedness due to the rigid construction of the corrugated core gasket and the flexibility of the graphite encapsulation and the fluorocarbon polymer encapsulation of the inner diameter. Positive sealing is possible even when the gasket is misaligned on a flange or other surface, or where such surface is smooth, polished, scratched, rough, pitted, or uses an RMS-type finish. The ring gasket of the invention is also of an environmentally and occupationally safe, non-asbestos construction.

Additionally, as disclosed herein, the combined properties of the concentric corrugations in the core gasket and the graphite and fluorocarbon polymer encapsulation of the gasket provide the attributes of fail-safe operability at high pressures and temperatures, particularly during thermal cycling from high temperatures to low temperatures and vice versa. These attributes contribute greatly to the smooth, safe, and time efficient day-to-day operation of the process employing the ring gaskets or ring seals of the invention.

The ring gasket design of the invention also inhibits gasket creep or cold flow. The plurality of parallel, barrier seals created by the corrugation on the core gasket, the corrugation-contoured graphite encapsulation of such core gasket, and the fluorocarbon polymer encapsulation of the inner diameter minimize extrusion of the graphite and fluorocarbon polymer coatings on the gasket, thereby preventing a seal blow-out.

In addition to providing quick, continuous, and reliable sealing under a broad range of operating conditions, the chemically resistant inner sealing surface of the gasket system extends the operability of the invention to include processes formerly incompatible with gaskets encapsulated only with graphite. Where it is desirable to use graphite gaskets to seal flanges in certain services involving the containment or transport of fluids (i.e., liquids and/or gases, with or without solids), the presence of a chemically resistant inner sealing surface prevents fluid contamination by graphite particles separated from the gasket. Thus, the advantages of a graphite gasket (e.g., low permeability, conformability, low seating stress, and fire resistance) may now be achieved with most petrochemical fluid services. For example, the increased safety associated with a fire-resistant graphite gasket can now be realized in a lube oil service process.

While the invention has been described in conjunction with specific alternative embodiments thereof, it is evident that many other alternatives, modifications and variations will be apparent to those skilled in the art in light of the foregoing description. For example, while differing metallurgies have been described for use as the concentrically corrugated core of the gaskets of the invention, skilled artisans could employ other metallurgies or materials (e.g., ceramic compositions, having the desired physical and chemical properties) as the core substrate of a gasket according to the invention. Accordingly, it is intended to embrace all such alternatives, modifications, and variations as fall within the spirit and broad scope of the appended claims.

What is claimed is:

1. A method of sealing two substantially parallel surfaces, comprising:

interposing between said surfaces a laminated gasket, said gasket comprising:
   a core defining an aperture therein, said core having an outer edge portion, an inner edge portion immediately surrounding said aperture and an intermediate portion between the outer edge portion and the inner edge portion;
   first and second layers of expanded fluorocarbon polymer applied to opposite sides of said core and coupled together to only encapsulate said inner edge portion, wherein the intermediate portion is not covered by the first and second layers of expanded fluorocarbon polymer; and
   first and second layers of expanded graphite material applied to opposite sides of said core and coupled together to only encapsulate said outer edge portion, wherein the intermediate portion is not covered by the first and second layers of expanded graphite material;

positioning said core between said two substantially parallel surfaces; and securing said two substantially parallel surfaces to one another.

2. A method of forming a laminated gasket, comprising:

providing a core defining an aperture therein, said core having an outer edge portion and an inner edge portion immediately surrounding said aperture;

encapsulating said outer edge portion only by applying first and second layers of expanded graphite material to opposite sides of said core and coupling them together; and encapsulating said inner edge portion only by applying first and second layers of expanded fluorocarbon polymer to opposite sides of said core and coupling them together, wherein the first and second layers of expanded fluorocarbon polymer do not abut the first and second layers of expanded graphite material.

3. A method of forming a laminated gasket, comprising:

providing a core defining an aperture therein, the core having an outer edge portion and an inner edge portion immediately surrounding said aperture;

providing first and second layers of expanded fluorocarbon polymer;

applying the first and second layers of expanded fluorocarbon polymer to opposite sides of the core;

coupling the first layer of expanded fluorocarbon polymer to the second layer of expanded fluorocarbon polymer to provide a fluid-impervious margin only along the inner edge portion of the core;

providing first and second layers of expanded graphite;

applying the first and second layers of expanded graphite to opposite sides of the core;

coupling the first layer of expanded graphite to the second layer of expanded graphite to provide a fluid-impervious margin only along the outer edge portion of the core, wherein the expanded fluorocarbon polymer and the expanded graphite do not touch.

4. The method of claim 3, wherein the core comprises corrugations on a selected portion.

5. The method of claim 4, wherein the corrugated portion is selected such that non-corrugated inner and outer portions of the core are formed, the non-corrugated portions being essentially parallel to the layers to be coupled.

6. The method of claim 5, wherein coupling the first layer of expanded fluorocarbon polymer to the second layer of expanded fluorocarbon polymer is performed along the inner edge portion of the core.

7. A method of forming a laminated gasket, comprising:

providing a core defining an aperture therein, said core having an outer edge portion, an intermediate portion adjacent to the outer edge portion and an inner edge portion adjacent to the intermediate portion and immediately surrounding the aperture and corrugations on a selected portion of the core such that non-corrugated inner and outer portions of the core are formed, the non-corrugated portions being essentially parallel to the layers to be coupled;

providing first and second layers of expanded fluorocarbon polymer;

applying the first and second layers of expanded fluorocarbon polymer only to opposite sides of the inner edge portion of the core;

coupling the first layer of expanded fluorocarbon polymer to the second layer of expanded fluorocarbon polymer to provide a fluid-impervious margin along the inner edge portion of the core;

providing first and second layers of expanded graphite;

applying the first and second layers of expanded graphite only to opposite sides of the outer edge portion of the core; and coupling the first layer of expanded graphite to the second layer of expanded graphite to provide a fluid-impervious margin along the outer edge portion, wherein the intermediate portion is uncovered.

8. A ribbed, laminated gasket, comprising:

a core defining an aperture therein, said core having an outer edge portion, an intermediate portion and an inner edge portion immediately surrounding said aperture;

at least one interior rib inside the inner edge portion of the core defining partitioned chambers within the aperture;

an expanded fluorocarbon polymer only applied to the at least one interior rib on opposite sides of the core to provide a fluid-impervious margin along the inner edge portion and a section of the interior rib; and an expanded graphite material only applied to opposite sides of the core to provide a fluid-impervious margin along the outer edge portion, wherein after manufacture and before use the intermediate portion is uncovered.

9. A method of forming a laminated gasket, comprising:

providing a core defining an aperture therein, the core having an outer edge portion, an intermediate portion and an inner edge portion immediately surrounding the aperture;

providing a plurality of adhesive layers;

providing first and second layers of expanded fluorocarbon polymer;

applying an adhesive layer to a side of each expanded fluorocarbon polymer layer;

applying the first and second layers of expanded fluorocarbon polymer to opposite sides of the core such that the adhesive is disposed between each layer of expanded fluorocarbon polymer and the core;

coupling the first layer of expanded fluorocarbon polymer to the second layer of expanded fluorocarbon polymer to provide complete encapsulation of an edge portion of the core by only the expanded fluorocarbon polymer, wherein the intermediate portion is not encapsulated;

providing first and second expanded layers of graphite;

applying an adhesive layer to a side of each expanded graphite layer;

applying the first and second layers of expanded graphite to opposite sides of the core such that the adhesive layer is disposed between each layer of expanded graphite and the core; and coupling the first layer of expanded graphite to the second layer of expanded graphite to provide complete encapsulation of another edge portion of the core by only the expanded graphite, wherein before compression of the core the intermediate portion is not encapsulated.

10. The method of forming a laminated gasket of claim 9, further comprising:

compressing the layers of expanded fluorocarbon polymer, expanded graphite and adhesive to the core; and heating the gasket until the adhesive layer is carbonized.

11. A hybrid gasket for sealing surfaces, comprising:

a core having an outer portion and an inner portion defining an aperture, wherein the core is corrugated;

a first material only surrounding the inner portion, wherein the first material is chemically resistant to a liquid;

a second material only surrounding the outer portion, wherein the second material and the first material are not overlapped; and an intermediate region interposed between the outer portion and inner portion, wherein the first material only surrounds the inner portion and the second material only surrounds the outer portion.

12. The hybrid gasket of claim 11, wherein the first material is expanded fluorocarbon polymer and the second material is expanded graphite.

* * * * *